United States Patent
Limpibunterng et al.

(10) Patent No.: US 7,530,423 B2
(45) Date of Patent: May 12, 2009

(54) VEHICULAR VARIABLE STEERING RATIO CONTROL DEVICE AND CONTROL METHOD THEREOF

(75) Inventors: Theerawat Limpibunterng, Susono (JP); Takahiro Kojo, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 205 days.

(21) Appl. No.: 11/581,460

(22) Filed: Oct. 17, 2006

(65) Prior Publication Data
US 2007/0107979 A1 May 17, 2007

(30) Foreign Application Priority Data
Nov. 2, 2005 (JP) ............... 2005-319512

(51) Int. Cl.
*B62D 5/04* (2006.01)
(52) U.S. Cl. .................. 180/446; 180/444; 701/41
(58) Field of Classification Search .............. 180/444, 180/446; 701/41
See application file for complete search history.

(56) References Cited

U.S. PATENT DOCUMENTS

| | | | |
|---|---|---|---|
| 4,874,054 A * | 10/1989 | Watanabe | 180/414 |
| 5,053,966 A * | 10/1991 | Takahashi et al. | 701/41 |
| 5,508,919 A * | 4/1996 | Suzuki et al. | 701/41 |
| 6,219,603 B1 | 4/2001 | Yamamoto et al. | |
| 6,226,580 B1 * | 5/2001 | Noro et al. | 701/42 |
| 6,450,287 B1 * | 9/2002 | Kurishige et al. | 180/446 |
| 6,763,908 B2 * | 7/2004 | Ogawa et al. | 180/446 |
| 6,854,560 B2 * | 2/2005 | Nishiyama et al. | 180/446 |
| 7,392,878 B2 * | 7/2008 | Ono et al. | 180/421 |
| 7,401,678 B2 * | 7/2008 | Yuasa et al. | 180/444 |
| 7,406,374 B2 * | 7/2008 | Ono et al. | 701/41 |
| 7,413,052 B2 * | 8/2008 | Sasaki et al. | 180/444 |
| 7,431,117 B2 * | 10/2008 | Ito | 180/204 |
| 7,444,217 B2 * | 10/2008 | Matsuoka | 701/34 |
| 7,447,578 B2 * | 11/2008 | Satoh et al. | 701/41 |
| 7,472,773 B2 * | 1/2009 | Fukuda et al. | 180/444 |
| 2007/0029129 A1 * | 2/2007 | Shiozawa et al. | 180/446 |

FOREIGN PATENT DOCUMENTS

DE    199 20 450 A1    12/1999
JP    A 11-321684    11/1999

* cited by examiner

*Primary Examiner*—Paul N Dickson
*Assistant Examiner*—Patrick Centolanzi
(74) *Attorney, Agent, or Firm*—Oliff & Berridge, PLC

(57) ABSTRACT

An operation torque estimating portion estimates an operation torque Th of a driver based on an input angle θh and an input torque T output from a torque sensor. A non-holding state detecting portion determines whether the driver is holding a steering wheel by comparing an absolute value of the operation torque Th and a predetermined value $\epsilon 1$. An equilibrium detecting portion determines whether an equilibrium point is reached by comparing the absolute value of the input torque T with a predetermined value $\epsilon 2$. When it is determined that the driver is not holding the steering wheel and the equilibrium point is reached, a switching portion switches to such a position that causes a target steering adjusting portion to multiply a target output angle θ pm by a predetermined gain G according to the input torque T so that the target steering angle is made smaller.

7 Claims, 9 Drawing Sheets

VEHICULAR VARIABLE STEERING RATIO CONTROL DEVICE AND CONTROL METHOD THEREOF

INCORPORATION BY REFERENCE

The disclosure of Japanese Patent Application No. 2005-319512 filed on Nov. 2, 2005, including the specification, drawings and abstract is incorporated herein by reference in its entirety.

BACKGROUND OF THE INVENTION

1. Field of the Invention

The invention relates to a steering control apparatus of a vehicle that includes variable steering ratio controlling means for changing a relationship between the steering angle of steered wheels and the steering angle of the steering by applying a driving force to the steering input.

2. Description of the Related Art

A steering control apparatus (VGRS: Variable Gear Ratio Steering) that includes variable steering ratio controlling means that can change the ratio between the steering angle of a steering wheel and the steering angle of steered wheels is known (for example, refer to Japanese Patent Application Publication No. JP-A-H11-321684). This technology aims at realizing desired steering response under various operational conditions of the vehicle by, for example, changing the steering ratio according to the vehicle speed. To realize such variable steering ratio controlling means, for example, a transmission portion such as a gear is provided at a connection point between the input shaft in the steering wheel side and the output shaft in the tie rods side, and the relative rotation angles of the input shaft and the output shaft are changed by applying driving force to the transmission portion by an actuator. It should be noted that the actuator that applies the driving force to the transmission portion may constitute the transmission portion. Note that for such steering ratio control there is a method in which feedback control is performed so as to achieve a target steering angle.

In feedback control for variable steering ratio control as described above, the accuracy of position control is improved by setting the control gain high. However, when the driver is not holding the steering wheel (will be referred to as a "non-holding state" where necessary), the reaction force from the actuator is not received by the steering wheel side, and therefore the control system becomes unstable. As a result, the steering wheel may vibrate. Such a non-holding state may occur while the steering wheel is being returned to the neutral position.

In the technology disclosed in Japanese Patent Publication Application No. JP-A-H11-321684, for the purpose of reducing vibration when the driver is not holding the steering wheel, such a non-holding state is detected based on the torque that the driver applies to the steering wheel, and when it is detected, the control gain is reduced.

However, when the control gain is reduced in this manner, the accuracy of position control and the steering response are deteriorated, and thus there is the problem that the positional deviation due to external disturbances becomes large.

SUMMARY OF THE INVENTION

It is an object of the invention to provide a vehicular steering control apparatus and a control method thereof that can suppress vibration which occurs when the driver is not holding the steering wheel, while reducing the positional deviation due to external disturbances.

A first aspect of the invention relates to a vehicular steering control apparatus including: (1) a variable steering ratio controlling device that controls a steering angle of steered wheels by applying a driving force to a steering input; (2) an input torque obtaining unit that obtains an input torque that is applied to a steering train of a steering system by external forces; (3) an operation torque calculating unit that calculates an operation torque that a driver applies to a steering; and (4) a target steering angle adjusting unit that sets a target steering angle of the variable steering ratio controlling device smaller when a first condition which is satisfied if the operation torque is smaller than a first predetermined value and a second condition which is satisfied if the input torque is smaller than a second predetermined value are both satisfied, than when at least one of the first and the second conditions is not satisfied.

A second aspect of the invention relates to a vehicular steering control apparatus that includes a phase adjusting unit that, when a first condition which is satisfied if the operation torque is smaller than a first predetermined value and a second condition which is satisfied if the input torque is smaller than a second predetermined value are both satisfied, sets a phase of a target steering angle of the variable steering ratio controlling device to a phase that is different from a phase set when at least one of the first and the second conditions is not satisfied. In this apparatus, the phase adjusting unit is provided instead of the target steering angle adjusting unit of the apparatus according to the first aspect of the invention, which sets a target steering angle of the variable steering ratio controlling device smaller when a first condition which is satisfied if the operation torque is smaller than a first predetermined value and a second condition which is satisfied if the input torque is smaller than a second predetermined value are both satisfied, than when at least one of the first and the second conditions is not satisfied.

A third aspect of the invention relates to a steering control method for a vehicle including a variable steering ratio controlling device that controls a steering angle of steered wheels by applying a driving force to a steering input. In the steering control method of the vehicle, an input torque that is applied to a steering train of a steering system by external forces and an operation torque that the driver applies to a steering are obtained, and a target steering angle of the variable steering ratio controlling device is set smaller when a first condition which is satisfied if the operation torque is smaller than a first predetermined value and a second condition which is satisfied if the input torque is smaller than a second predetermined value are both satisfied, than when at least one of the first and the second conditions is not satisfied.

A fourth aspect of the invention relates to a steering control method for a vehicle including a variable steering ratio controlling device that controls a steering angle of steered wheels by applying a driving force to a steering input. In the steering control method of the vehicle, an input torque that is applied to a steering train of a steering system by external forces and an operation torque that a driver applies to a steering are obtained, and when a first condition which is satisfied if the operation torque is smaller than a first predetermined value and a second condition which is satisfied the input torque is smaller than a second predetermined value are both satisfied, a phase of a target steering angle of the variable steering ratio controlling device is set to a phase that is different from a phase set when at least one of the first and the second conditions is not satisfied.

The aforementioned vibration that occurs in the steering system including the variable steering ratio controlling device when the driver is not holding the steering wheel tends to intermittently occur near the equilibrium point after the steering wheel returns to around the neutral position. According to the invention, the vibration reduction control is performed when the driver is not holding the steering wheel (i.e., the operation torque is smaller than the first predetermined value) while the equilibrium point is reached (i.e., the input torque is smaller than the second predetermined value). It should be noted that the term "equilibrium point" herein indicates the point where the torque input to the steering side and the reaction force from the steered wheels are in equilibrium.

The vibration reduction control according to the invention varies the response of the target steering angle, and in the first method, vibration is forcibly attenuated by setting the target steering angle smaller. In the second method, attenuation of vibration is promoted by changing the phase of the target steering angle from one which causes vibration. As the method to change the phase, for example, the filtering frequency for calculating the target steering angle may be changed.

According to the invention, when the driver is not holding the steering wheel around the equilibrium point, attenuation of vibration is promoted and occurrence of vibration is prevented by changing the response of the target steering angle. As a result, it is possible to effectively prevent or reduce vibration around the equilibrium point. In addition, the vibration reduction control is performed only when the driver is not holding the steering wheel while the equilibrium point is reached, and therefore the accuracy of position control and the steering response are not deteriorated. When there are some external disturbances, the vibration reduction control is not performed, and thus the positional deviation due to the external disturbances can also be prevented.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
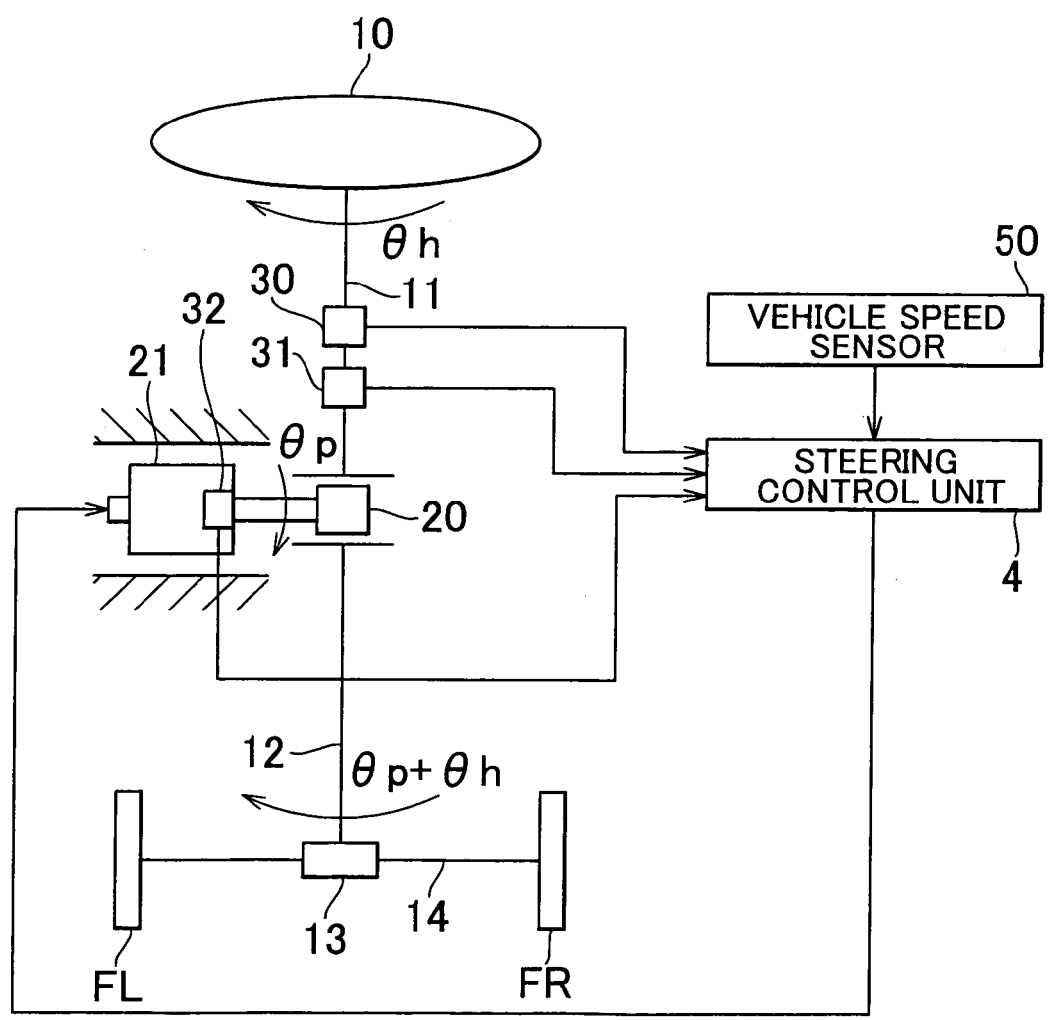
FIG. 1 is a view schematically showing the steering system that includes a vehicular steering control apparatus according to the first embodiment of the invention.

Preferred embodiments of the invention will be hereinafter described in detail with reference to the attached drawings. In order to facilitate understanding of the description, the same reference numerals are used for the same elements in the drawings as much as possible, and same descriptions of the elements are omitted.

Figure 2:
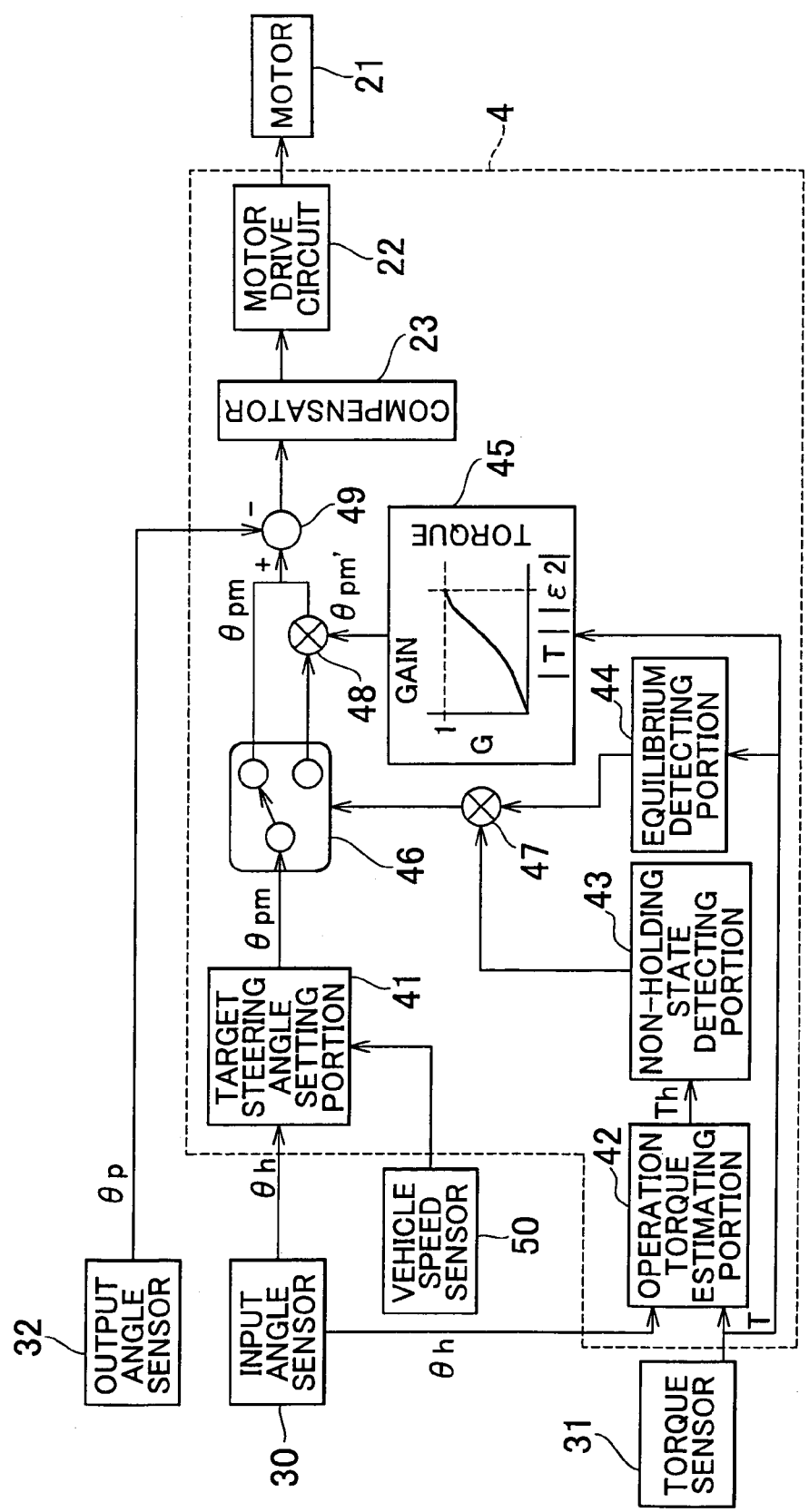
FIG. 2 is a control block diagram showing the configuration of the first embodiment.

As shown in FIGS. 1 and 2, a steering system functions to turn a right front wheel FR and a left front wheel FL, which are steered wheels, as a steering wheel 10 is turned. Rotation of a steering shaft that is connected to the steering wheel 10 is converted to a linear motion in the horizontal direction at a steering gear box 13, and is then transmitted to the front wheels FR, FL through a tie rod 14.

The steering shaft includes an input shaft 11 connected to the steering wheel 10 and an output shaft 12 connected to the steering gear box 13, which serves as a steering input. A gear mechanism 20 is provided between the input shaft 11 and the output shaft 12. An electric motor 21 is connected to the gear mechanism 20. They constitute variable steering ratio controlling device.

An input angle sensor 30 and a torque sensor 31 are provided on the input shaft 11. The input angle sensor 30 detects an operation angle $\theta h$ of the steering wheel 10, and the torque sensor 31 detects an input torque T to the steering train of the steering system. The input torque T is resultant force of external forces which are applying to the steering train of the steering system other than an operation torque Th (as will hereinafter be described in detail). A motor output angle sensor 32 that detects a motor output shaft turning angle $\theta p$ is provided on the motor output shaft of the motor 21. The turning angle of the output shaft 12 is the sum of $\theta h$ and $\theta p$ ($\theta h + \theta p$), and this value has a predetermined relationship with the steering angle of the front wheels FR, FL.

A steering control unit 4 includes a CPU, a ROM, a RAM, an electric circuit etc., and the output signals from the input angle sensor 30, the torque sensor 31, the motor output angle sensor 32, and a vehicle speed sensor 50 that detects a vehicle speed V of the vehicle are input to the steering control unit 4. The steering control unit 4 controls the driving of the motor 21.

As shown in FIG. 2, the steering control unit 4 further includes a target steering angle setting portion 41, an operation torque estimating portion 42, a non-holding state detecting portion 43, an equilibrium detecting portion 44, a target steering angle adjusting portion 45, a switching portion 46, a compensator 23, a motor drive circuit 22, multipliers 47, 48, and an adder 49.

The target steering angle setting portion 41 sets a target output angle $\theta pm$ based on the vehicle speed V detected by the vehicle speed sensor 50 and the operation angle $\theta h$ detected by the input angle sensor 30. The turning angle $\theta h + \theta p$ of the output shaft 12 and the steering angle $\delta$ of the steered wheels have a predetermined relationship defined by the characteristics of the steering gear box 13. Therefore, setting the target output angle $\theta pm$ in accordance with the operation angle $\theta h$ is synonymous with setting the target steering angle $\delta m$.

The operation torque estimating portion 42 estimates an operation torque Th applied by a driver using an equation (1) that factors in the input torque T at the steering train of the steering system which is detected by the torque sensor 31, and the operation angle $\theta h$ which is detected by the input angle sensor 30.

$$Th = Ih\frac{d^2\theta h}{dt^2} + Ch\frac{d\theta h}{dt} + T \qquad (1)$$

The reference symbol Ih denotes a moment of inertia at the steering wheel 10, and Ch denotes a coefficient of viscous friction against the rotation of the input shaft 11. The inertia moment Ih and the viscous friction coefficient Ch have values specific to the type or structure of each steering system. Therefore, by obtaining the inertia moment Ih and the viscous friction coefficient Ch in advance and storing them in the operation torque estimating portion 42, it is possible to estimate the operation torque Th from the input torque T, an angular velocity and an angular acceleration of the operation angle θh.

Then, based on the input torque T and the operation torque Th, the non-holding state detecting portion 43 detects a non-holding state which is the state where the driver is not holding the steering 10 and the equilibrium detecting portion 44 determines whether an equilibrium point, to be described later, is reached. Specifically, the non-holding state detecting portion 43 detects the non-holding state by comparing the absolute value of the operation torque Th and a threshold value ϵ1. The threshold value ϵ1 is set to a value at and above which it is considered that the driver is holding the steering wheel 10 controllably. That is, if the absolute value |Th| is equal to or larger than the threshold value ϵ1, the non-holding state detecting portion 43 determines that the non-holding state is not present and therefore outputs "0" to the multiplier 47. When the absolute value |Th| is smaller than the threshold value ϵ1, conversely, the non-holding state detecting portion 43 determines that the non-holding state is present and therefore outputs "1" to the multiplier 47. Meanwhile, the equilibrium detecting portion 44 determines whether an equilibrium point is reached by comparing the absolute value of the input torque T and a threshold value ϵ2. The threshold value ϵ2 is set to a value corresponding to a state where the respective inputs to the steering train of the steering system, i.e., the input from the driver to the steering wheel 10 is equilibrates to the assist torque from the motor 21 and the reaction force from the steered wheels FL, FR side. That is, if the absolute value |T| is equal to or larger than the threshold value ϵ2, the equilibrium detecting portion 44 determines that the equilibrium point is not reached, and outputs "0" to the multiplier 47. If the absolute value |T| is smaller than the threshold value ϵ2, the equilibrium detecting portion 44 determines that the equilibrium point is reached and outputs "1" to the multiplier 47.

The output values (0 or 1) from the non-holding state detecting portion 43 and the equilibrium detecting portion 44 are multiplied by the multiplier 47. In this way, "1" is output to the switching portion 46 only when the non-holding state is present and the equilibrium point is reached. When either or both of the these conditions is not satisfied, such as when the driver is holding the steering wheel 10, or when the driver is not holding the steering wheel 10 but the equilibrium point is not reached, "0" is output to the switching portion 46.

The switching portion 46 is connected to the output side of the target steering angle setting portion 41, and the operation of the switching portion 46 is controlled by the output from the multiplier 47. More specifically, when the output value of the multiplier 47 is 0, the switch is set to the upper position in the switching portion 46, as seen in the drawing, and θpm output from the target steering angle setting portion 41 is directly input to a positive input terminal of the adder 49. When the output value of the multiplier 47 is 1, the switch is set to the lower position in the switching portion 46, as seen in the drawing. A multiplier 48 is provided between the positive input terminal of the adder 49 and the switching portion 46, and θpm' calculated by the multiplier 48 is input to the positive input terminal of the adder 49. The output value of a target steering angle adjusting portion 45 is input to the multiplier 48. The target steering angle adjusting portion 45 sets a gain G in accordance with the input torque T detected by the torque sensor 31. The gain G is 1 when the absolute value of the input torque T is equal to the threshold value ϵ2, and approaches 0 as the input torque T decreases. That is, θpm' which is the output value of the multiplier 48, is obtained by multiplying G with θpm (G×θpm), and therefore it approaches 0 as the input torque T decreases.

θp output from the motor output angle sensor 32 is input to a negative input terminal of the adder 49. Therefore, when it is determined that the driver is not holding the steering wheel 10 and the equilibrium point is reached, the output from the adder 49 is θpm'-θp. In other cases, the output value of the adder 49 is θpm-θp. That is, the difference between the adjusted target output angle and the actual output angle is output to the compensator 23.

The compensator 23 calculates the driving amount of the motor 21 in accordance with the difference between the target output angle and the actual output angle, and transmits the calculated driving amount to the motor drive circuit 22. The motor drive circuit 22 then drives the motor 21 according to the driving amount. In this way, by bringing the actual output angle closer to the target output angle, the steering angle is controlled to be come a desired angle.

Figure 3:
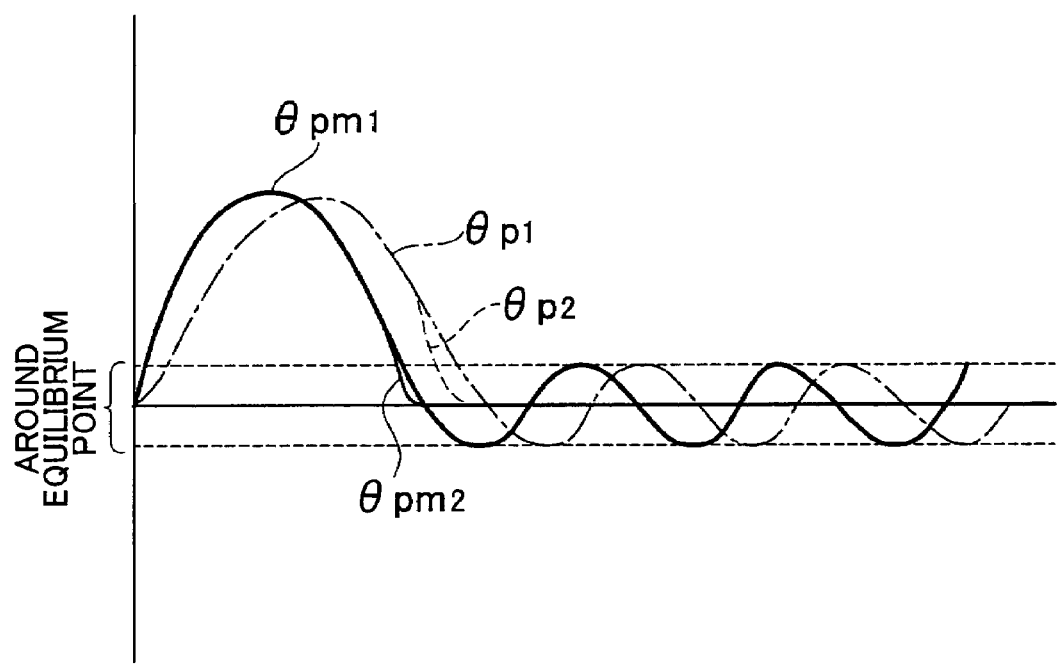
FIG. 3 is a graph showing a comparison between the result of the steering control of the first embodiment and the result of steering control in which no vibration reduction control is performed.

FIG. 3 is a graph showing a comparison between the result of the steering control of the first embodiment and the result of steering control in which no vibration reduction control is performed, when the driver takes his or her hands off the steering wheel 10 so as to allow the steering wheel 10 to turn back to the neutral position after turning the steering wheel 10 to the maximum steering angle. In the graph, θpm1 shows changes with time in the target output angle and θp1 shows changes with time in the actual output angle during the steering control with no vibration reduction control. On the other hand, θpm2 shows changes with time in the target output angle and θp2 shows changes with time in the actual output angle during the steering control of the embodiment.

Unavoidably, the actual output angle changes with delay in response to a change in the target output angle due to, for example, deformation and friction in the steering train of the steering system. Because of such delay, vibration occurs around the neutral position during the steering control with no vibration reduction control. To counter this, in the steering control of the embodiment, when the steering reaches around the neutral position, which corresponds to the equilibrium point, the target output angle is reduced to reduce the target steering angle (see θpm2). As a result, the operation amount of the motor 21 is reduced, so that vibration is effectively suppressed (see θp2). In this case, the control gain is substantially the same as used in a regular control, and therefore good steering response is maintained. Meanwhile, in the case where an external force is acting on the steering train of the steering system and thus the equilibrium point is not reached, the regular control is performed, and therefore the accuracy of position control and the response can be maintained. Accordingly, the steering control apparatus of the embodiment improves the overall steering feeling.

Figure 4:
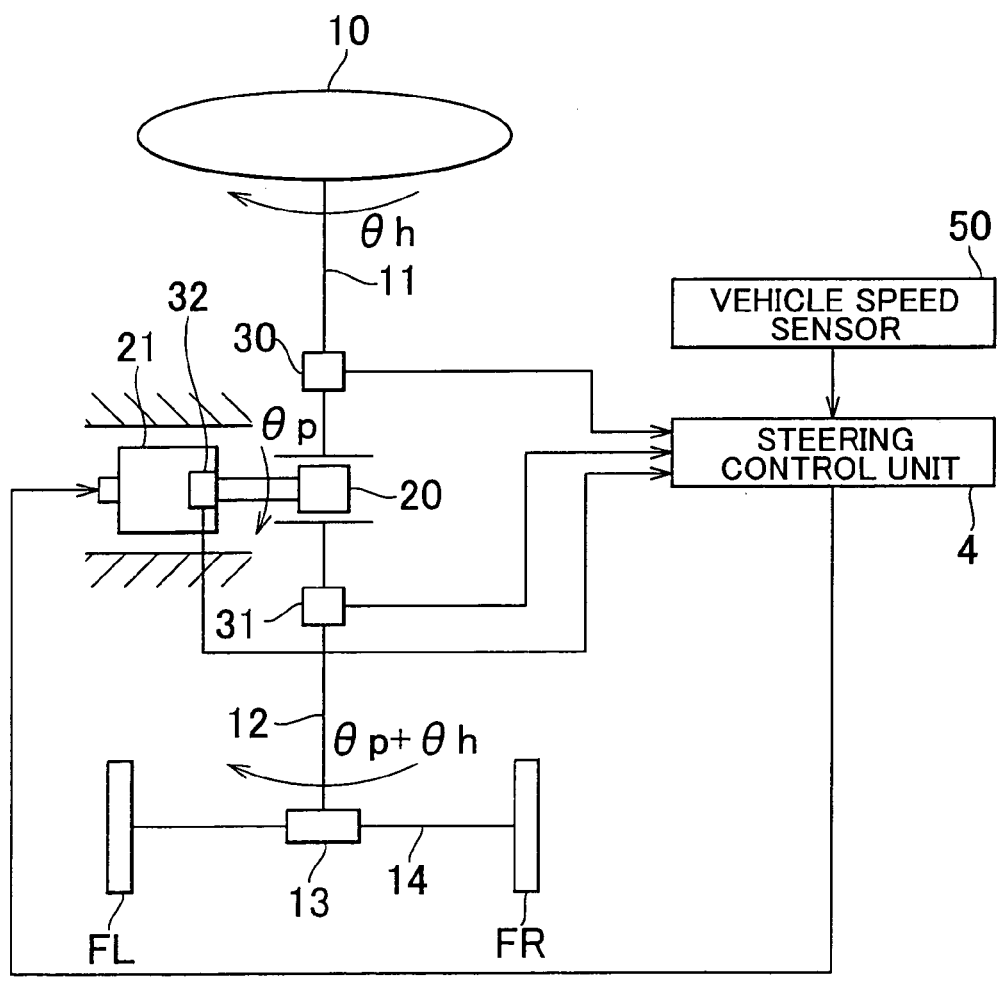
FIG. 4 is a view schematically showing a steering system as modified from the first embodiment.

In the first embodiment, the torque sensor 31 is provided on the input shaft 11, but it may alternatively be provided on the output shaft 12 as shown in FIG. 4. In this case, too, it is possible to estimate the operation torque Th based on the equation (1).

Figure 5:
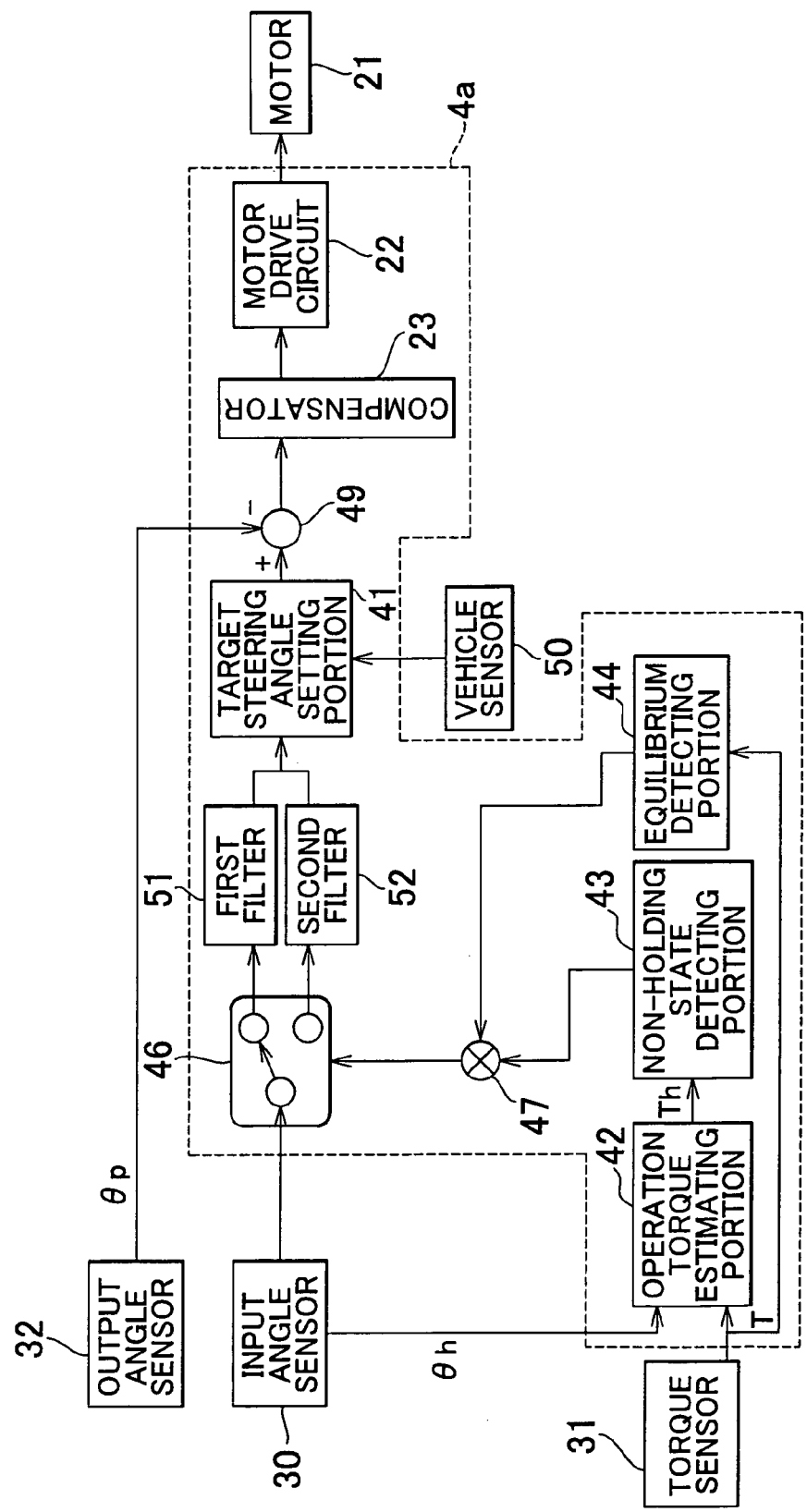
FIG. 5 is a control block diagram showing the configuration of the second embodiment.

FIG. 5 is a block diagram showing the configuration of a vehicular steering control apparatus according to the second embodiment of the invention. This apparatus is used as a steering control apparatus for the steering system shown in FIG. 1 or FIG. 4. In the steering control unit 4 of the first embodiment shown in FIG. 2, as mentioned above, the switching portion 46 is provided between the target steering angle setting portion 41 and the adder 49, and it switches, in accordance with the output value of the multiplier 47, between the mode where the output of the target steering angle setting portion 41 is directly input to the adder 49 and the mode where the output of the target steering angle setting portion 41 is adjusted using the output value of the target steering angle adjusting portion 45. Meanwhile, in a steering control unit 4a of the second embodiment, the switching portion 46 is provided between the input angle sensor 30 and the target steering angle setting portion 41, and a filter for filtering the input angle signals input to the target steering angle setting portion 41 is switched between a first filter 51 and a second filter 52.

The first filter 51 and the second filter 52 have different filter frequencies, therefore the phase characteristic of the target output angle set by the target steering angle setting portion 41 is different depending on which of the first filter 51 or the second filter 52 is used. The use of such different phase characteristics, in particular, makes it possible to suppress resonance caused by a phase difference between the target output angle input to the adder 49 and the measured output angle when vibration occurs. The phase characteristic of the target output angle obtained with the second filter 52 can be made different from that obtained with the first filter 51 by setting the filter frequency of the second filter 52 higher or lower than the filter frequency of the first filter 51.

Figure 6:
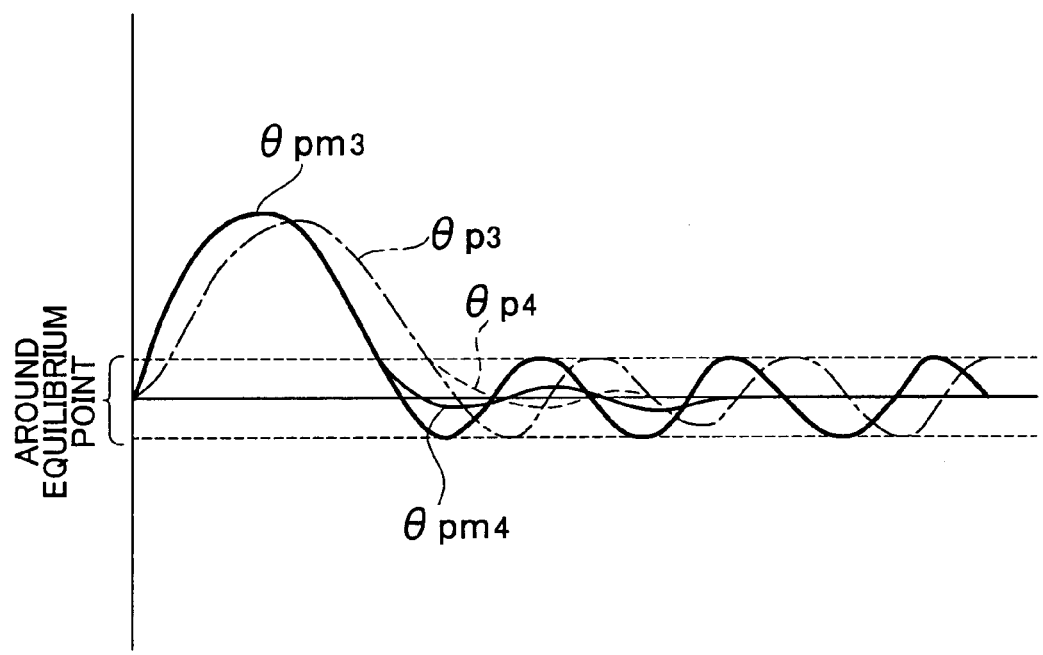
FIG. 6 is a graph showing a comparison between the result of the steering control of the second embodiment and the result of steering control in which no vibration reduction control is performed.

FIG. 6 is a graph showing a comparison between the result of the steering control of the embodiment and the result of steering control in which no vibration reduction control is performed, when the driver takes his or her hands off the steering wheel 10 so as to allow the steering wheel 10 to turn back to the neutral position after turning the steering wheel 10 to the maximum steering angle. In the graph, θpm3 shows changes with time in the target output angle and θp3 shows changes with time in the actual output angle during the steering control with no vibration reduction control. On the other hand, θpm4 shows changes with time in the target output angle and θp4 shows changes with time in the actual output angle during the steering control of the embodiment.

In the steering control with no vibration reduction control, when vibration occurs, the vibration cannot be reduced because the phase relationship between the target output angle and the actual output angle promotes resonance, and as a result, the vibration continues for a long time. In order to prevent such resonance, during the steering control of the embodiment, the phase characteristic of the target output angle is selectivelyset. Therefore, when vibration is occurring, the vibration is effectively and immediately attenuated. Similarly to the first embodiment, in the case where an external force is acting on the steering train of the steering system and thus the equilibrium point is not reached, i.e., one of the conditions for performing the vibration reduction control is not satisfied, the regular control is performed, and therefore the accuracy of position control and the response are not deteriorated. Accordingly, the steering control apparatus of the embodiment improves the overall steering feeling.

Figure 7:
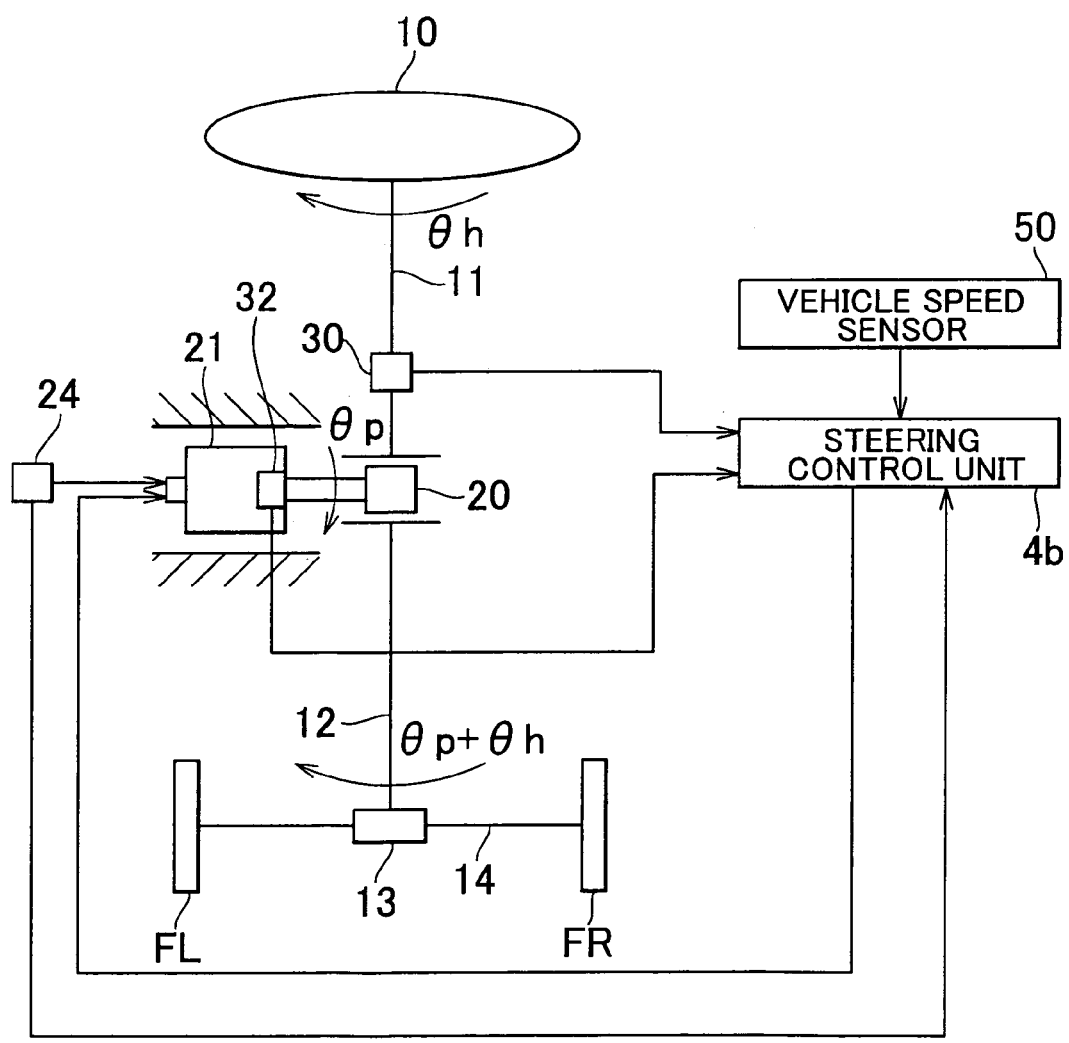
FIG. 7 is a view schematically showing the steering system that includes a vehicular steering control apparatus according to the third embodiment of the invention.
Figure 8:
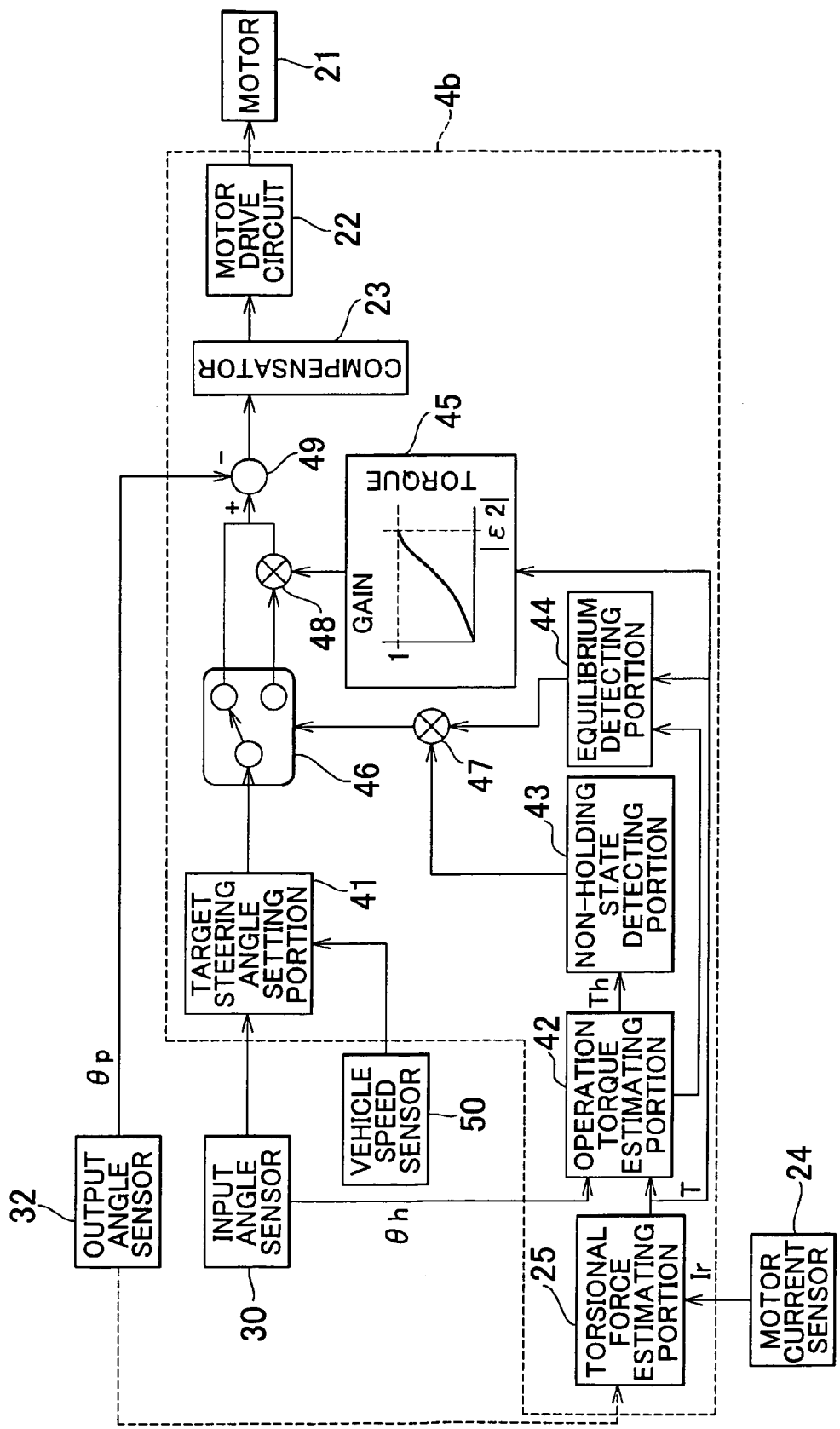
FIG. 8 is a control block diagram showing the configuration of the third embodiment.

FIG. 7 is a view schematically showing the configuration of a steering system incorporating a steering control apparatus according to the third embodiment of the invention, and FIG. 8 is a block diagram showing the configuration of the steering control apparatus. The steering system in the third embodiment, as shown in FIG. 7, differs from those shown in FIGS. 1 and 4 in that the torque sensor 31 is removed and a motor current sensor 24 that detects current supplied to the motor 21 is provided.

As shown in FIG. 8, a steering control unit 4b has basically the same configuration as the steering control unit 4 in the first embodiment. In the steering system shown in FIG. 2, as mentioned above, the torque sensor 31 serves as an input torque obtaining portion that detects the input torque T that is applied to the steering train of the steering system by external forces, and the output from the torque sensor 31 is directly input to the operation torque estimating portion 42 and the equilibrium detecting portion 44. In contrast, in the steering system of the third embodiment shown in FIG. 8, a torsional force estimating portion 25 serves as the input torque obtaining portion that receives a current value Ir output from the motor current sensor 24 and estimates the input torque T based on it is provided.

In the steering system in FIG. 7, the steering wheel 10 does not receive the torque generated by the motor 21. Therefore, the torsional force acting on the input shaft 11 is estimated using an equation (2) which factors in the inertia moment Im of the motor 21 and the gear mechanism 20 and the viscous friction coefficient Cm.

$$T = KmGmIr - Im\frac{d^2\theta p}{dt^2} - Cm\frac{d\theta p}{dt} \quad (2)$$

Km denotes the torque constant of the motor 21, and Gm denotes the transmission ratio of the variable steering ratio control mechanism. The operation torque applied by the driver can be estimated by assigning the result of the equation (2) into the equation (1).

In the third embodiment, similar effects and advantages to those in the first embodiment can be obtained. The steering control apparatus according to the third embodiment, for example, may be advantageously employed in a hydraulic power steering apparatus. On the other hand, the steering control apparatus according to the first embodiment may be advantageously employed in an electric power steering apparatus.

Figure 9:
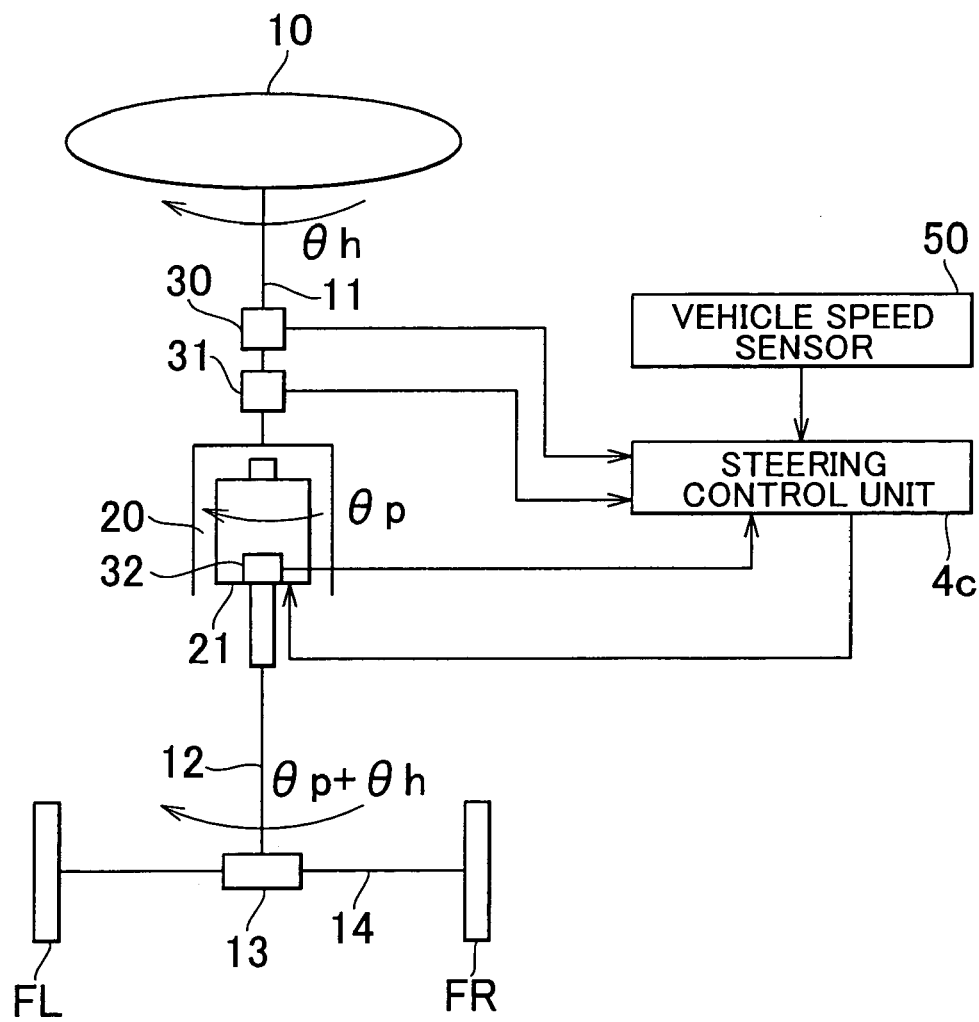
FIG. 9 is a view schematically showing a steering system including variable steering ratio controlling device as modified from the first embodiment.

The variable steering ratio control mechanism is not limited to those described above, but may be constructed such that, for example, the steering input directly receives torque from the electric motor as shown in FIG. 9. In this case, since the equation of motion for the steering system is different from those in the foregoing embodiments, different calculation methods are used for estimating the operation torque of the driver and the input torque. However, the basic concept is the same.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A vehicular variable steering ratio control device that controls a steering angle of steered wheels by applying a driving force to a steering input, comprising:
   an input torque obtaining portion that obtains an input torque that is applied to a steering train of a steering system by external forces;
   an operation torque estimating portion that calculates an operation torque that a driver applies to a steering;
   a target steering angle adjusting portion that sets a target steering angle of the variable steering ratio control device smaller when a first condition which is satisfied if the operation torque is smaller than a first predetermined value and a second condition which is satisfied if the input torque is smaller than a second predetermined value are both satisfied, than when at least one of the first and the second conditions is not satisfied; and
   a motor that applies driving force to the steering input to the steered wheels based on the set target steering angle.

2. The vehicular variable steering ratio control device according to claim 1, wherein
   the input torque obtaining portion includes a torque detector that detects the input torque.

3. The vehicular variable steering ratio control device according to claim 1, further comprising an electric motor that applies the driving force to the steering input and a motor current detector that detects a value of current supplied to the electric motor,
   wherein the input torque obtaining unit includes a torsional force estimating portion that estimates the input torque based on the detected current value.

4. The vehicular variable steering ratio control device according to claim 1, wherein
   the operation torque estimating portion estimates the operation torque based on the input torque, a steering angular velocity, and a steering angular acceleration.

5. The vehicular variable steering ratio control device according to claim 1, wherein
   the target steering angle adjusting portion sets the target steering angle smaller as the input torque becomes smaller.

6. A steering control method for a vehicle including a variable steering ratio control device that controls a steering angle of steered wheels by applying a driving force to a steering input, comprising:
   obtaining an input torque that is applied to a steering train of a steering system by external forces;
   calculating an operation torque that a driver applies to a steering;
   setting a target steering angle of the variable steering ratio control device smaller when a first condition which is satisfied if the operation torque is smaller than a first predetermined value and a second condition which is satisfied if the input torque is smaller than a second predetermined value are both satisfied, than when at least one of the first and the second conditions is not satisfied; and
   applying a driving force to the steering input to the steered wheels based on the target steering angle.

7. The steering control method for the vehicle according to claim 6, wherein
   the operation torque is estimated based on the input torque, a steering angular velocity, and a steering angular acceleration.

* * * * *